United States Patent [19]

Cochran

[11] Patent Number: 5,074,722
[45] Date of Patent: Dec. 24, 1991

[54] HOLE CUTTER

[75] Inventor: Paul Cochran, Stillman Valley, Ill.

[73] Assignee: Greenlee Textron Inc., Rockford, Ill.

[21] Appl. No.: 670,302

[22] Filed: Mar. 15, 1991

[51] Int. Cl.$^5$ .............................................. B23B 51/04
[52] U.S. Cl. .................................. 408/204; 76/108.6; 408/209
[58] Field of Search ................ 76/108.6; 408/200, 201, 408/204, 206, 207, 209, 224, 225, 703

[56] References Cited

FOREIGN PATENT DOCUMENTS

| 375526 | 6/1990 | European Pat. Off. | 408/204 |
| 2080162 | 2/1982 | United Kingdom | 408/204 |
| 2104808 | 3/1983 | United Kingdom | 408/204 |

OTHER PUBLICATIONS

Greenlee Product Advertisement, "Hole Saws", 2 pages.

American Tool Advertisement, "Unibit Carbide Hole Cutter", 3 pages.

Primary Examiner—Daniel W. Howell
Attorney, Agent, or Firm—Trexler, Bushnell, Giangiorgi & Blackstone, Ltd.

[57] ABSTRACT

A rotary cutting devbice for cutting holes in a workpiece and a method of making a rotary cutting device. The method includes machining a notch across a face of a generally cylindrical body. The body has a longitudinally extending central axis and a central bore formed concentric therewith. Machining the notch forms at least one generally arcuate protrusion on a face of the body. A slot is formed through each of the protrusions resulting in two teeth being formed on either side of the mouth of the slots. A cutting tooth and a stabilizing tooth is formed on each side of the mouth of each slot formed in the body. The cutting tooth removes material from the workpiece and the stabilizing tooth limits the feed rate and prevents grabbing when a rotary motion is applied thereto.

22 Claims, 2 Drawing Sheets

HOLE CUTTER

BACKGROUND OF THE INVENTION

This invention relates generally to the hole cutting tool art and more particularly to rotary cutting devices for boring holes in a workpiece.

The ability to quickly, efficiently and accurately form a hole through a workpiece has many applications. As such, numerous types of hole cutting devices have been devised. Auger and spiral bits are probably the most common for drilling small diameter holes, however, larger diameter holes require a different bit structure.

For example, two general types of hole cutting devices include a serrated band formed in a circular pattern and a single edge boring device. The serrated band is formed by cutting serrations along one edge of a band of material and forming the band of material into a cylindrical shape. The cylindrical shape is mounted so that it may be retained as such under the force of rotation. Rotary movement of the cylindrical band forms a bore. A problem arises with this type of device in that the band requires many serrations to be formed therein and is limited to materials which facilitate forming a band into a cylinder. A similar device formed from a rigid cylindrical body and not a band, typically requires many machining operations in order to achieve desired results.

Another form of cutting device is a single edge boring device. An example of such a device is the UNIBIT manufactured by Cobra Tools, P.O. Box 356, Dewitt, Neb. 68341. The UNIBIT is formed with a rigid cylindrical body having a groove formed partially therethrough. A carbide cutting edge is mounted to one edge of the groove for cutting material from the workpiece. The cutting edge extends slightly above a circular front face of the cylindrical body in order to lead the device in the cutting operation. The rigid form of the cylindrical body provides substantially greater support than the serrated tooth cutting device discussed above.

The single edge cutting device has several limitations. For example, the cutting device requires many manufacturing operations to form the cylindrical body and requires cutting a groove therethrough. The body is formed of an appropriately strong material such as some type of steel. The cutting edge attached in the groove is formed of different material, usually a material having desired cutting characteristics such as carbide. A notch must be precisely formed in the groove to receive the separate cutting edge. After the carbide cutting edge is attached to the notch burrs or irregularities must be removed from the joint between the cutting tip and the notch to avoid forming an eccentric hole when the cutting device is used. Additionally, it is possible that this carbide tip requires sharpening after these operations in order to provide an efficient cutting edge.

Not only are there problems in the manufacturing of the single cutting edge device, but such a device also encounters problems in operation. The single cutting edge tends to be unbalanced to some degree since the single cutting edge is inherently unstable. A lack of balance of the single cutting edge device results in a degree of wobble increasing the inaccuracy of the hole formed thereby as well as increasing the friction and subsequently the wear and the effort required in cutting a hole.

OBJECTS AND SUMMARY OF THE INVENTION

A general object of the present invention is to provide a rotary cutting device which may be quickly, efficiently and accurately manufactured from a unitary body.

Another general object of the present invention is to provide a rotary cutting device which increases the balance and stability of the device to increase the accuracy of the device and decrease the friction and wear on the device thereby decreasing the effort and increasing the speed at which the device cuts a hole.

Another general object of the present invention is to provide a rotary cutting device which limits the feed rate of cutting and prevents gouging of material in which a hole is formed.

A more specific objective of the present invention is to provide a method of forming a rotary cutting device which minimizes the manufacturing steps required in forming a precise rotary cutting device from a unitary body.

Yet a further object of the present invention is to provide a rotary cutting device which employs diametrically opposed cutting and stabilizing protrusions for increasing the stability of the device when in use.

Briefly and in accordance with the foregoing, the present invention comprises a novel rotary cutting device and method for forming a rotary cutting device.

BRIEF DESCRIPTION OF THE DRAWINGS

The organization, method, and manner of operation of the invention, together with the further objects and advantages thereof, may be understood by reference to the following description taken in connection with the accompanying drawings in which like reference numerals identify like elements, and which.

DESCRIPTION OF THE ILLUSTRATED EMBODIMENT

Figure 1:
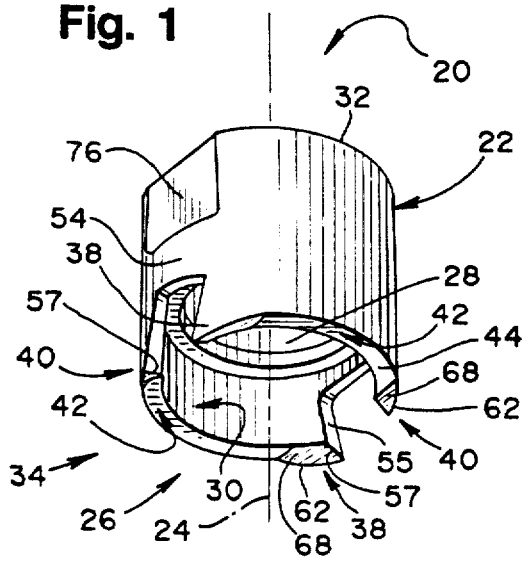
FIG. 1 is a perspective view of a rotary cutting device of the present invention as viewed from underneath a front face thereof.

While this invention may be susceptible to embodiment in different forms, there is shown in the drawings and will be described herein in detail, a preferred embodiment of the invention with the understanding that the present disclosure is to be considered an exemplification of the principals of the invention, and is not intended to limit the invention to the embodiment illustrated and described herein.

It should be noted that the dimensional relationship between members of the illustrated embodiment may vary in practice or may have been varied in the illustrations to emphasize certain features of the invention.

Turning now to FIG. 1, a rotary cutting device 20 is shown. Generally, the cutting device 20 has a cylindrical body 22 with a central axis 24 extending therethrough. A central bore 26 is formed coaxially with the central axis 24, extending through the cylindrical body 22. A primary threaded bore 28 and an enlarged secondary bore 30 extend through the cylindrical body 22 coaxial with the central axis 24. The cylindrical body 22 is oriented with an engaging end 32 and a cutting end 34. As will be described in further detail hereinbelow, the engaging end 32 removably attaches the rotary cutting device 20 to an arbor 36 and the cutting end 34 is employed for removing material, in a rotary fashion, from a workpiece.

Figure 2:
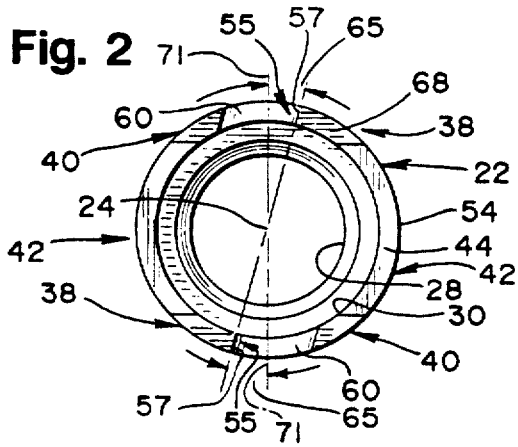
FIG. 2 is a plan view of the front face of the rotary cutting device as shown in FIG. 1 illustrating the angle of slots formed in the cutting device relative to a reference center line.
Figure 3:
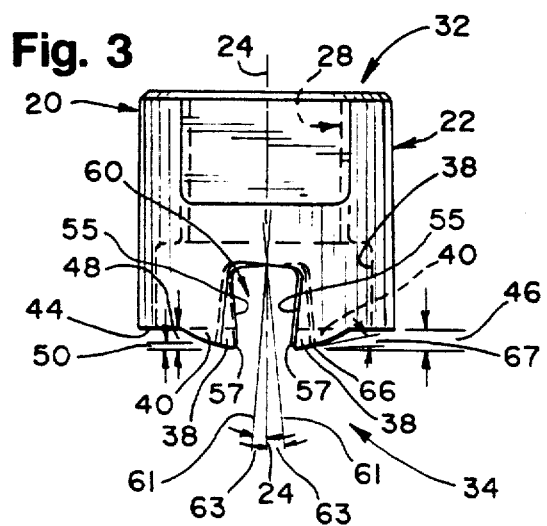
FIG. 3 is a side elevation of the rotary cutting device.
Figure 4:
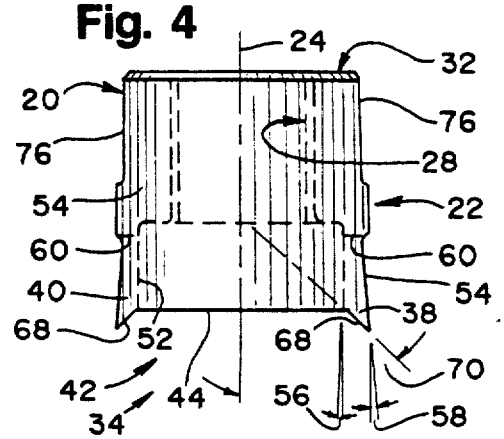
FIG. 4 is a side elevation of the rotary cutting device rotated 90° from the view as shown in FIG. 3.

As shown in FIG. 1, with further reference to FIGS. 2, 3 and 4, the cutting end 34 has two cutting teeth 38 and two stabilizing teeth 40 attached thereto. The cutting teeth 38 and the stabilizing teeth 40 are respectively diametrically opposed on the cutting end 34 of the cutting device 20. Two notches 42 are formed on the cutting end 34 of the cylindrical body 22 between each of the two pairs of cutting and stabilizing teeth 38, 40. As shown in FIG. 3, each cutting tooth 38 extends away from a face 44 of a corresponding notch 42, a dimension defining the cutting tooth height 46. Likewise the stabilizing teeth 40 extend away from the face 44 of the notch 42 a dimension defining the stabilizing tooth height 48. The cutting tooth height 46 is greater than the stabilizing tooth height 48, resulting in a depth of cut 50 as the difference between the two tooth heights 46, 48.

Figure 5:
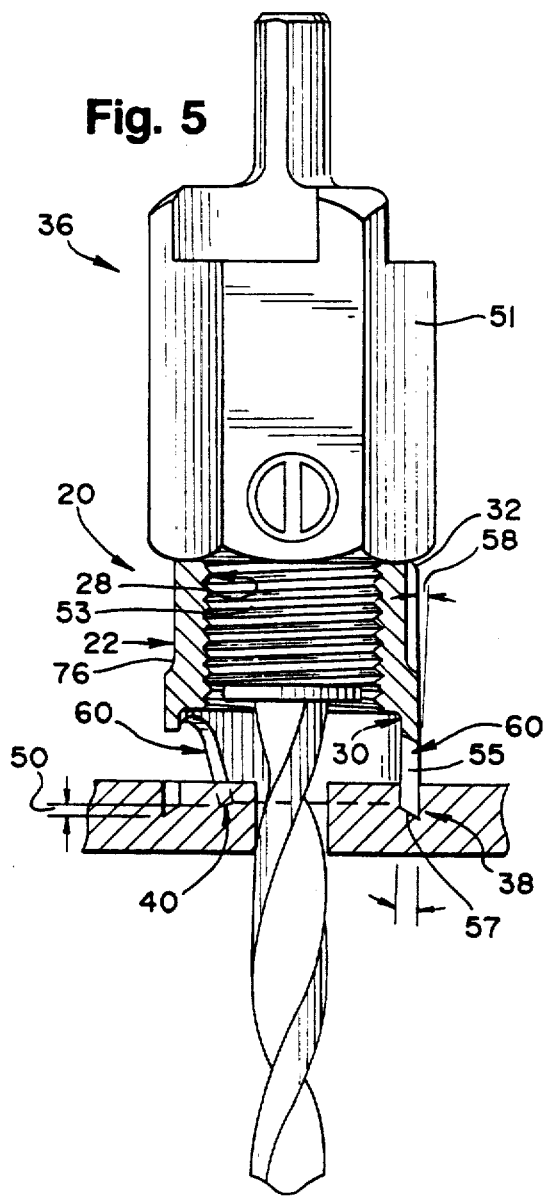
FIG. 5 is a partial fragmentary elevation of the rotary cutting device of the present invention attached to an arbor having a pilot bit and employed in cutting a hole through a workpiece.

In use, as shown in FIG. 5, the cutting device 20 is attached to the arbor 36. The arbor 36 includes a shank portion 51 and an engaging portion 53. The shank portion 51 is engagable with a rotary drive device such as a drill (not shown) and the engaging portion 53 engages the engaging end 32 of the cutting device 20. Removable attachment of the cutting device 20 on the arbor 36 permits replacement of only the cutting device 20 when the cutting end 34 become worn and attachment of the cutting device 20 to arbors 36 which are sized for a variety of chucks.

When the cutting device is rotated, the diametrically opposed arrangement of the cutting teeth 38 and the stabilizing teeth 40 reduces the degree of wobble induced in the cutting operation. Each cutting tooth 38 has a matched cutting tooth 38 opposite therefrom, and each stabilizing tooth 40 is diametrically opposed from a matched stabilizing tooth 40. The stabilizing teeth 40 support and lead the corresponding cutting tooth 38 in the cutting operation. The stabilizing tooth 40 limits the feed rate of the cut in the workpiece and prevents the cutting tooth 38 from "grabbing" or gouging the workpiece. In other words, the stabilizing tooth 40 limits the amount of material which can be removed by the cutting tooth 38 on each pass to the depth of cut 50 thereby preventing the cutting tooth 38 from taking too big of a bite relative to the available driving torque. The stability of the cutting device 20 increases the accuracy of the cut by decreasing grabbing, wobbling and spreading, thereby decreasing hole irregularities.

With reference to FIG. 4, the cutting accuracy of the cutting device 20 is further increased by providing tapered surfaces on an inside surface 52 of the secondary bore 30 and on an exterior surface 54 of the cylindrical body 22. The inside surface 52 is tapered inwardly towards the central axis 24 a predetermined angle 56. Likewise, the exterior surface 54 of the cylindrical body 22 is tapered outwardly away from the central axis 24 at a predetermined exterior angle 58. Interior angle 56 and exterior angle 58 are generally small, but provide sufficient relief to increase the accuracy and cutting life of the device 20 by substantially reducing the friction created between the device and the workpiece. Further, the reduction of friction created by the tapered surfaces increases the ease at which a workpiece is cut as wear is reduced and resistance to cutting is reduced.

The cutting and stabilizing teeth 38, 40 attached to the cutting end 34 of the device 20 have a unique shape which promotes cutting into a workpiece. Each cutting tooth 38 is separated from a corresponding stabilizing tooth 40 by an angled slot 60 formed therebetween. Angling of the slot 60 results in the cutting tooth height 46 which is greater than the stabilizing tooth height 48. The angled slot 60 extends into and through the cylindrical body 22 and provides an opening through which chips and other cutting debris may pass out of the secondary bore 30.

As best shown in FIG. 3, the angled slot 60 interrupts a generally continuous arcuate protrusion to form the cutting tooth and the stabilizing tooth 38, 40. Edges 62 of the teeth 38,40 retain a generally arcuate shape and produce a gently curved leading edge 64 on the stabilizing tooth 40 and a similar trailing edge 66 on the cutting tooth 38. The slot 60 is formed with the cutting tooth 38 and the stabilizing tooth 40 on opposite sides of the central axis 24.

The width and angle of the slot 60 as well as the position of the cutting and stabilizing teeth 38, 40 control the clearance characteristics and depth of cut 50. Position of the cutting and stabilizing teeth 38, 40 relative to the central axis 24 (as viewed in elevation as in FIG. 3) produces a clearance angle 67 on the trailing edge 66 of the cutting tooth 38 which promotes cutting action. The further the cutting tooth 38 is from the central axis 24 the greater the clearance angle 67. A clearance angle 67 of approximately 7° is illustrated in FIG. 3. The clearance angle 67 could be any of a range of angles which may be empirically determined to produce desired results depending on various factors including the material to be cut. If the cutting and stabilizing teeth 38, 40 were on the same side of the central axis 24 there would be no clearance or negative clearance for the clearance angle 67 thereby preventing cutting action.

As shown in FIG. 3, each slot 60 has a center line 61 extending therethrough, resulting in a slot angle 63 measured between the center line 61 and the central axis 24. The slot angle 63 ranges from approximately 5° to 15° in order to achieve a desired depth of cut 50. The slot angle 61 may be decreased to reduce the depth of cut 50 or increased in order to increase the dept of cut 50. With reference to FIG. 2, the center lines 61 are non-coincident with the central axis 24. An offset dimension 65, measured between the center line of the slot 61 and the central axis 24 results in a larger cutting tooth 40 relative to the size of the stabilizing tooth 38.

Figure 9:
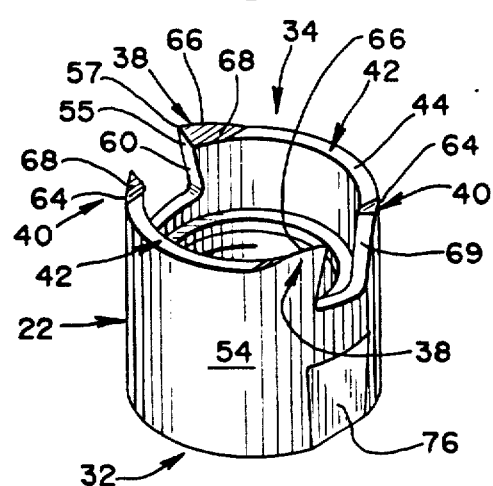
FIG. 9 shows a second angled slot formed through the second arcuate protrusion resulting in the finished rotary cutting device of the present invention.

As shown in FIGS. 1-3 and 9, a working face 55 is formed on a surface of each cutting tooth 38 formed by the slot 60. The working face 55 extends beyond the stabilizing tooth 40 for the distance of the depth of cut 50. As best shown in FIGS. 1 and 9 the working face 55 is formed by the slot 60 passing through an arcuate protrusion 74 and a surface 68 of the protrusion 74 is angled 70, therefore, the resulting working face 55 terminates in a cutting edge 57.

With reference to FIG. 2, the cutting edge 57 and a corresponding lead edge 59 have an angular offset 65 relative to a axis line 71 extending through the central axis 24 of the cylindrical body 22. The angular offset 65 as shown is approximately 16° but may range approximately from greater than 0° to 30°. If the cutting edge 57 were formed generally parallel to the axis line forces established during cutting would tend to spread or deform the cutting edge 57 and direct chips produced during the cutting process inwardly.

The angular offset 65 of the cutting edge 57 counteracts generally tangential force vectors created during the cutting operation. The angular offset 65 provides a cutting edge 57 which is generally perpendicular relative to these tangential force vectors. The result of the angular offset 65 is that the cutting edge 57 has more support for preventing and reducing deformation of the cutting edge 57 during the cutting operation. Additionally, the angle of the angular offset 65 directs chips outwardly.

While the outside surface of the cutting and stabilizing teeth 38, 40 is generally continuous with the exterior surface 54 of the cylindrical body 22, an interior surface 68 of each tooth 38, 40 is a generally planar surface interrupted by the mouth of the slot 60. The interior surface 68 of each pair of cutting and stabilizing teeth 38, 40 is formed in a common plane. The tooth edge 62 of the teeth 38, 40 is formed at the intersection of the interior surface 68 and the exterior surface 54 of the cylindrical body 22. With reference to FIG. 4, a tooth angle 70 is formed and measured between the interior surface 68 and the central axis 24. While the tooth angle 70 is generally formed at substantially on the order of 30°, it has an effective range of substantially on the order of from 10° to 75°. A steeper tooth angle 70 provides a more aggressive cut in the cutting operation.

FIGS. 6 through 9 provide a series of progressions in order to illustrate the method of forming the rotary cutting device 20. The method of producing the rotary cutting device 20 is extremely efficient because the number of cuts and operations required in forming the device 20 are minimized.

Figure 6:
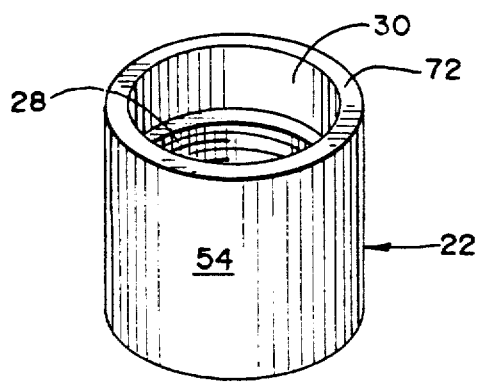
FIG. 6 is a perspective view of a cylindrical body viewed from above directed towards the front face thereof, showing a first step in the method of forming the rotary cutting device of the present invention therefrom.

FIG. 6 shows a cylindrical body 22 which has been prepared for forming the cutting end 34 of the device 20 by forming the secondary bore 30 and the primary threaded bore 28 therein. The cylindrical body 22 is generally formed by turning operation. As shown in FIG. 6, the cutting end 34 of the device is a generally flat surface 72 prior to any cutting or other forming operations. The notch 42 is formed by removing material from the cylindrical body 22 along a path 73 across the flat surface 72 to form the sloped inside surfaces 68 of the teeth 38, 40. This can be done by various machining operations such as a milling or grinding operation. Generally, a grinding operation produces a more desirable finish and a sharper cutting edge.

Figure 7:
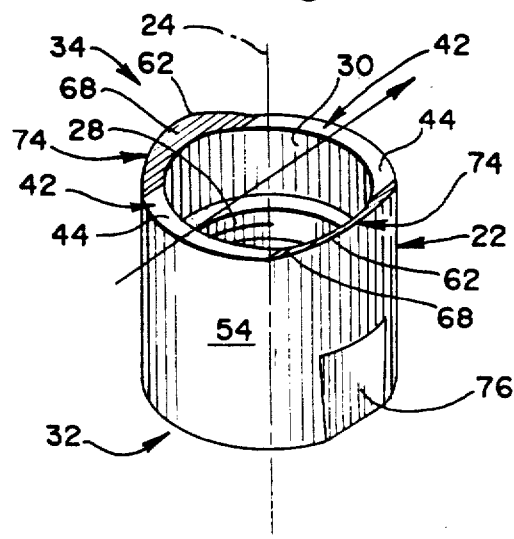
FIG. 7 is a perspective view showing a notch formed in the front face of the cylindrical body forming two generally arcuate protrusions thereon.

At the stage of production illustrated in FIG. 7, the discrete teeth 38, 40 have not been formed, thereby resulting in two notches 42 with two diametrically opposed arcuate protrusions 74 formed on the outsides thereof. The notches 42 are defined by the sloped inside surfaces 68 and the flat faces 44 formed therebetween. FIG. 7 also shows a flat surface 76 formed on the exterior surface 54 of the cylindrical body 22. As better shown in FIG. 4, two flat surfaces 6 are formed on opposite sides of the cylindrical body 2 and provide tool engaging surfaces for engaging the cutting device 20 with the arbor 36, as shown in FIG. 5.

Figure 8:
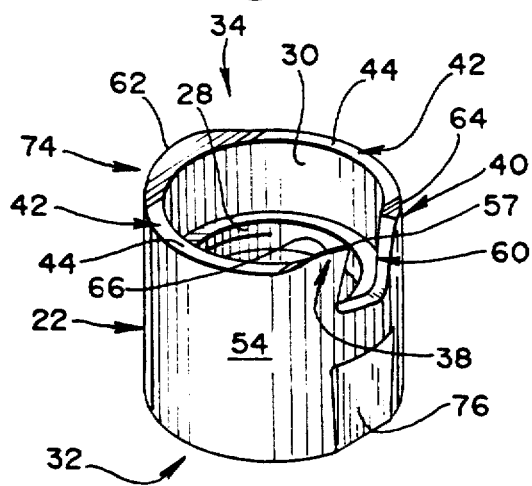
FIG. 8 is a perspective view showing an angled slot being formed through the cylindrical body through one of the arcuate protrusions.

FIG. 8 shows the next step in forming the cutting device 20. The next step includes forming an angled slot 60 through the cylindrical body 22 thereby creating a stabilizing tooth 40 and a cutting tooth 38, one on either side of the slot 60. The slot 60 is formed at a slot angle 63 and an angular offset 65 (as shown in FIG. 3) relative to the central axis 24 and the axis line 71, respectively, to produce the desired results discussed hereinabove.

In FIG. 9, a second slot 69 is formed through the cylindrical body 22 opposite the first slot 60 as formed in FIG. 8. FIG. 9 shows the finished device 20 which is formed through the three cutting steps as shown in FIGS. 7, 8 and 9. An additional minor finishing step includes removing any burrs by means of a known process to provide generally smooth and efficiently cutting surfaces In use, the cutting device 20 has a generally cylindrical body 22 with an engaging end 32 and a cutting end 34. The cutting end 34 has two pairs of teeth; each pair of teeth including a cutting tooth 38 and a stabilizing tooth 40. Each pair of teeth is diametrically opposed from the other pair of teeth on the cutting end 34 of the device 20. Also, each cutting tooth 38 and each stabilizing tooth 40 is diametrically opposed from a corresponding cutting tooth 38 and stabilizing tooth 40 in the diametrically opposed pair. The diametrically opposed position of the teeth 38, 40 increases the stability of the device, thereby reducing wobble and friction created in a hole-cutting operation. The reduction in wobble and friction decreases the eccentricity of the cut and increases the accuracy of the cut and further increases the life of the device as well as the effort required to cut a hole in a workpiece.

Each tooth is formed with a sloped interior surface 68 and an exterior surface 54 which is generally continuous with the cylindrical body 22. A tooth angle 70, measured relative to the central axis 24, defines the slope of the sloped interior surface 68. A slot 60 separates each cutting tooth 38 from a corresponding stabilizing tooth 40. The slot 60 is angled at a slot angle 63 and is formed through the cylindrical body 22 at an angular offset 65 relative to the central axis 24 and the axis line 71, respectively, 24. The slot angle 63 and the angular offset 65 produce predetermined desirable cutting characteristics in the cutting device 20.

A series of steps are performed on a cylindrical body 22, having a primary and a secondary bore 28,30 formed therethrough to produce the cutting device 20. A notch 42 is formed through a generally flat face surface 72 of the cylindrical body 22 to produce two generally arcuate protrusions 74 which are diametrically opposed on the cutting end 34 of the device 20. The arcuate protrusions 74 have an exterior surface generally continuous with the exterior 54 of the body 22 and an interior sloped surface 68 cut at a tooth angle 70 relative to the central axis 24. The next step in the process includes forming an angled slot 60 through the cylindrical body 22 such that the slot 60 extends through an arcuate protrusion 74 resulting in a cutting tooth 38 and a stabilizing tooth 40 being formed on each side of the angled slot 60. Finally, a second angled slot 69 is formed through the diametrically opposed arcuate protrusion 74 resulting in the configuration of the device shown in FIG. 9.

While a preferred embodiment of the present invention is shown and described, it is envisioned that those skilled in the art may devise various modifications of the present invention without departing from the spirit and scope of the appended claims.

The invention is claimed as follows:

1. A method of making a rotary cutting device comprising the following steps:
providing a cylindrical body having a central axis extending therethrough, a central bore formed in said cylindrical body concentric with said central axis, a front face being formed on said cylindrical body;
machining at least one notch across said front face substantially non-coincident with said central axis, at least one protrusion being formed upon machining said notch; and
machining at least one slot through said cylindrical body portion, said slot extending through said at least one protrusion, a cutting tooth and a stabilizing tooth being formed on either side of said slot.

2. A method according to claim 1 further comprising the steps of:
machining said at least one notch to form two diametrically opposed arcuate protrusions; and
machining a slot through each of said arcuate protrusions forming diametrically opposed cutting teeth and stabilizing teeth, one each of said cutting teeth and said stabilizing teeth being spaced apart by said slot.

3. A method according to claim 1 further including the steps of:
machining said slot at an angle relative to said central axis for forming the sides of said slot oblique to said central axis for promoting chip forming action during use.

4. A method according to claim 3 wherein said slot is machined through said body at an angle relative to said central axis of substantially on the order of from 5° to 15°.

5. A method according to claim 1 wherein said slot is machined through said body at an angular offset relative to an axis line generally perpendicular to said central axis.

6. A method according to claim 1 further including the step of:
machining said at least one notch to form a sloped face on said protuberance, said sloped face being angled away from said central axis at an angle of substantially on the order of from 10° to 75°.

7. A method according to claim 1 further including the steps of:
forming threads on an inside surface of said central bore; and
machining tool engaging surfaces on an end of said cylindrical body distal said front face for permitting threaded coupling of said cylindrical body with a cooperatively threaded arbor.

8. A method according to claim 2 further including the steps of:
machining at least two diametrically opposed slots through each of two corresponding arcuate protrusions, a central line of said slots machined through said cylindrical body being offset from said central axis.

9. A method according to claim 1 further including the steps of:
tapering an outside surface of said body, an exterior tapered surface being formed by tapering said exterior surface at an angle away from said central axis toward said front face; and
tapering an inside surface of said central bore, an interior tapered surface being formed by tapering said inside surface at an angle inwardly along said central axis towards said front face, said interior and exterior tapered surfaces reducing friction on said cutting device.

10. A rotary cutting device for cutting holes in a workpiece comprising a body, a central axis longitudinally extending through said body, a bore formed in said body concentric with said axis, a front face formed on one end of said cylindrical body portion; two cutting teeth and two stabilizing teeth attached to said front face of said cylindrical body for cutting material from a workpiece in a circular pattern and for stabilizing said cutting device while cutting material from a workpiece, a cutting tooth and a stabilizing tooth forming a pair of teeth, said pairs of teeth being generally equidistantly spaced apart along said front face; two slots extending through said body, each of said slots extending through said front face and spacing each cutting tooth away from a corresponding stabilizing tooth.

11. A rotary cutting device according to claim 10 wherein said cutting device is a unitary body formed of a single piece of material having suitable characteristics for cutting holes in a workpiece under the influence of a rotary motion.

12. A rotary cutting device according to claim 10 wherein a height dimension of each of said cutting teeth is greater than a height dimension of each of said stabilizing teeth, a depth of cut of the cutting device being measured as the difference between said height dimension of said cutting tooth and said height dimension of said stabilizing tooth.

13. A rotary cutting device according to claim 10 further including a partially arcuate edge on each of said cutting and stabilizing teeth, an exterior surface of said cutting and stabilizing teeth being generally continuous with said cylindrical body portion, an interior surface of said cutting and stabilizing teeth being generally sloped, said interior surface of each cutting tooth and each corresponding stabilizing tooth forming a planar surface interrupted by said slot extending therebetween, said planar surface sloping inwardly towards said central axis a predetermined angle, said partially arcuate edge of each tooth being formed at an intersection of said planar surface and said exterior surface of said cylindrical body.

14. A rotary cutting device according to claim 13 wherein said planar surface slopes inwardly towards said central axis at an angle of substantially on the order of from 10° to 75°.

15. A rotary cutting device according to claim 10 wherein an axis line extends generally perpendicularly through said central axis, said slots being angled relative to said axis line be an angular offset.

16. A rotary cutting device according to claim 15 wherein said angular offset is substantially on the order of between the range of greater than 0° to 30°.

17. A rotary cutting device according to claim 10 wherein said slots are formed with generally parallel sides, a center line spaced between said sides of said slots being offset from said central axis for enhancing chip removal from said cutting device.

18. A rotary cutting device according to claim 10 wherein an exterior surface of said body and an interior surface of said bore are tapered relative to said central axis for reducing friction on said cutting device when said cutting device is employed to cut a bore into a workpiece, said interior surface tapering inwardly relative to said central axis towards said front face, said exterior surface tapering outwardly relative to said central axis towards said front face.

19. A rotary cutting device according to claim 10 further including arbor engaging means formed on an end of said body distal said front face for cooperatively engaging a rotary arbor for transferring rotary movement from a rotary arbor to said cutting device.

20. A rotary cutting device according to claim 19 wherein said arbor engaging means include threads for cooperatively threadedly engaging corresponding cooperative threads formed on said arbor.

21. A rotary cutting device for cutting holes in a workpiece in combination with an arbor, said cutting device being removably attachable to said arbor; said arbor including a shank portion and an engaging portion, said shank portion being releasably retainable in a rotary drive apparatus and said engaging portion being releasably engagable with said cutting device for retaining said cutting device thereon; said cutting device comprising a body having a central axis and a concentric bore longitudinally extending therethrough, engaging means being formed on an engaging end of said body and cutting means being formed on a cutting end of said body distal said engaging end; said engaging means cooperatively engaging said engaging portion for retaining said cutting device on said arbor; said cutting means including two open ended slots extending through said body at diametrically opposed spaced apart locations, said slots extending through said front face, two pairs of teeth being attached to said front face, each pair of teeth being spaced apart on either side of said slot, each pair of teeth including a cutting tooth for removing material from said workpiece and a stabilizing tooth for stabilizing the cutting device when cutting material from said workpiece, each pair of teeth being attached to said face at locations diametrically opposed to the other pair of teeth.

22. A cutting device according to claim 21 wherein said arbor further includes a pilot bit attached to said engaging portion concentric with said central axis longitudinally extending along said central axis beyond said cutting end of said cutting device for piloting said cutting device into a workpiece.

* * * * *